UNITED STATES PATENT OFFICE.

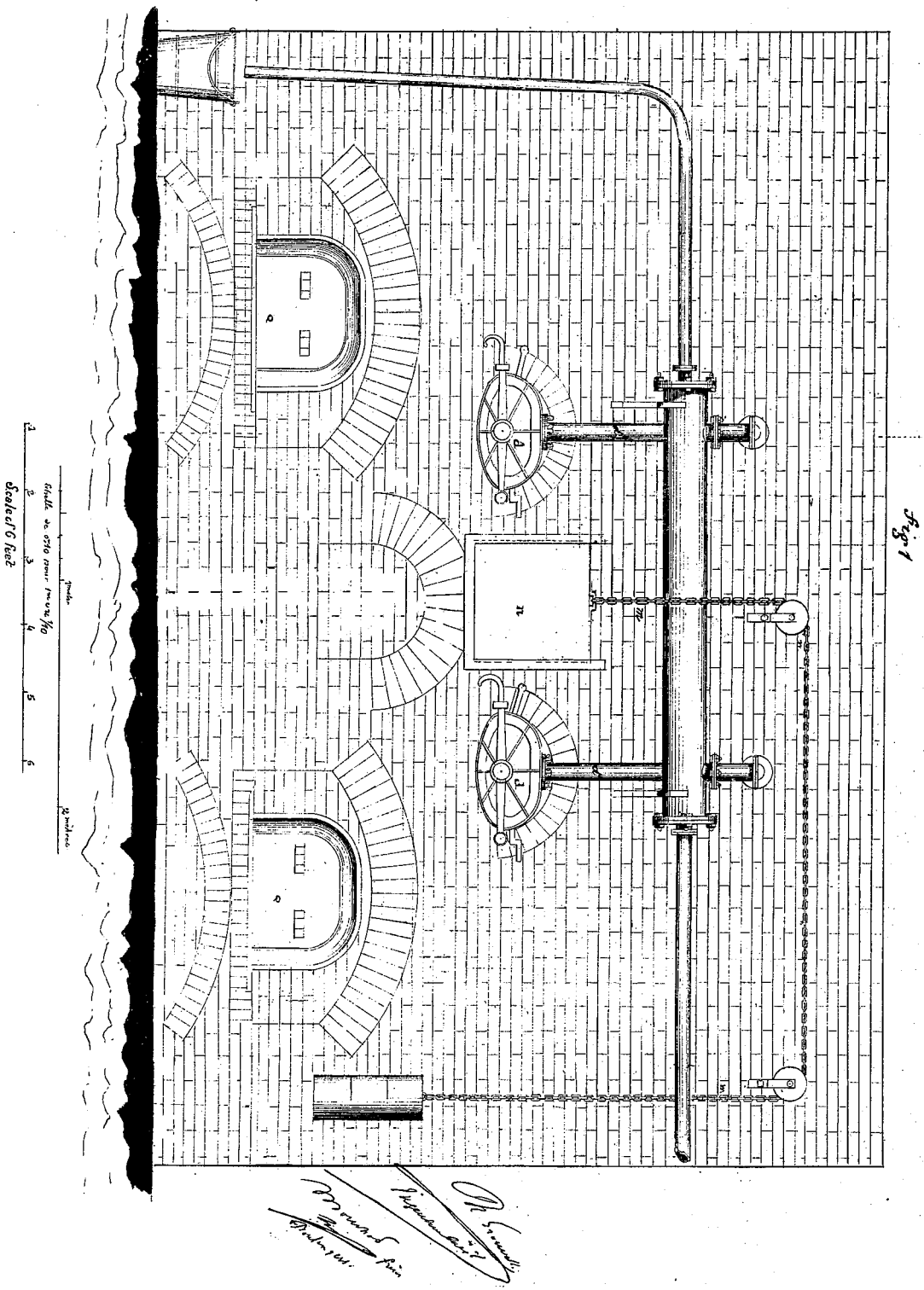

P. GRONVELLE, L. N. MONCHOT, AND E. MONCHOT, OF PARIS, FRANCE, ASSIGNORS TO B. RODRIGUES.

BAKE-OVEN.

Specification of Letters Patent No. 5,028, dated March 20, 1847.

*To all whom it may concern:*

Be it known that we, P. GRONVELLE, civil engineer, and L. N. MONCHOT and E. MONCHOT, bakers, natives and citizens of the Kingdom of France, residing at Paris, France, have invented new and useful improvements in the method of heating ovens by the circulation of heated air, called the "aerothermal oven," applicable to the baking of bread and pastry, to the torrefaction (roasting) of coffee, cocoa, &c., to the fabrication and revivification of animal black, the transmutation of fecula into dextrin, the annealing of metals, glass, &c., and other purposes requiring the application of a well-regulated temperature, and that the following is a full, clear, and exact description of the principle or character thereof which distinguishes it from all other things before known, reference being had to the accompanying drawings, making part of this specification, in which—

Figure 1, Plate 1, is a front view of the oven, showing the furnace doors, the door to the oven being at the back. Fig. 2, Plate 2, the same with the walls removed to exhibit the internal arrangement. Fig. 3, Plate 3, a transverse vertical section taken at the line (A, B) of Figs. 5 and 6. Fig. 4, Plate 4, a longitudinal vertical section taken at the line (C D) of Fig. 1. Fig. 5, Plate 5, a horizontal section taken at the line (E F) of Fig. 3. Fig. 6, Plate 5, a horizontal section at the line (G H). Fig. 7, Plate 6, a horizontal section taken at the line (I K), and Fig. 8, same plate, a horizontal section taken at the line (L M). Figs. 3, 5, 6, 7, and 8 are drawn to a smaller scale than the others. The other plates give representations of the various applications of the same principle and will be referred to hereafter.

The same letters indicate like parts in all the figures.

The nature of my invention consists in the employment of air as a vehicle to convey calorie to the oven from an air chamber, heated by furnaces, so that the same air circulates from the air heating chamber, under and through the oven, and when it has been partly condensed and its specific gravity increased, by giving out its contained calorie, return back, through another set of flues to the air heating chamber, there to be reheated, thus keeping up a constant circulation from the air heating chamber, around, and through the oven, and back again to the air heating chamber, instead of heating ovens by the circulation of air heated on its passage through a heated chamber, around the oven, or through it, and then escaping into the atmosphere. And also in combining with the above mode of heating ovens an arrangement of fire chambers without grates and ash pits, and with an arrangement of flues and dampers for heating the air and to assist in heating the oven, on the principle of returning the products of combustion to the fire-chamber, that is fire chambers, flues and dampers so arranged that the products of combustion, by the closing of the dampers, are returned to the fire chambers to consume the combustible gases, &c., and to retain the heat within the furnaces and flues, except when an active combustion may be required. And also in so arranging the flues through which the smoke and other products of combustion pass as to increase the temperature of the air as it circulates through a series of passages under the bottom of the oven to heat it, and thus increase its rarefaction and cause it to ascend into the oven.

The furnaces (M M), two in number, are made with the hearth or bottom flat, and of fire brick, or other refractory material, and with or without holes (a), leading into an arch below, but if made with holes they should be few in number and small to avoid too high a degree of combustion along the lower strata of fuel, such as takes place on grate bars which burn away with great rapidity by the intensity of the combustion immediately around them. The top of these furnaces is vaulted, as represented in the drawings, and flues (L, L, L), for the passage of smoke and other products of combustion, run up from each into a main flue or tunnel (H), provided with a partition (I) at the back end to divide the current of smoke, &c., and thus communicate with two sets of return flues (K, K), the outer extremity of which communicate with vertical flues (V, V), one at each of the back corners, that extend to return flues (A, A) on the top of the oven (C), that extend to and unite at the chimney (W), which is provided with a well constructed damper in the usual manner to regulate the escape of the smoke, &c., or prevent the escape and cause the return thereof through the same flues to the furnaces, when desired to make them act on the principle of air tight stoves.

At the forward end of the main flue or tunnel (H) there is a large aperture governed by a register (n) (suspended to a chain (m) passing over rollers and provided with a counter weight to facilitate its movement) for the purpose of admitting a large current of air to cool the flues, when it is desired to moderate or reduce the temperature of the oven or to admit a small quantity of air to promote the combustion of the combustible gases evolved from the fuel, when an increased temperature is required. And there are apertures (r, r) see Figs. 4 and 6 in the wall leading into the return flues (K K) to admit an appropriate instrument for cleaning them. These apertures are of course to be closed by appropriate stoppers (R) during the operation of the furnaces.

Back of the furnaces there is a chamber (P), called the hot air chamber, closed perfectly air tight at the bottom and sides. It is vaulted, and when of great capacity, the roof may be made of two or more arches sustained on pillars (b, b,). At each side, and from the top of this air chamber, there is a flue (G, G,) the direction of these flues is shown by dotted lines in Figs. 2 and 4 for the passage of hot air, which extends up nearly in a vertical direction, and then runs forward horizontally (as indicated by the double speared arrows (→→) in the drawings which indicate throughout the direction of the hot air) and then ascends into a horizontal chamber (E), under the bottom of the oven (C), which is divided off into flues by blocks of masonry (e) (see Figs. 3 and 7) arranged as represented in the drawings for the purpose of diffusing the currents of hot air, and deflecting and conducting them to vertical flues (Y, Y) represented by dotted lines in Fig. 8, that open into the oven (C). After the hot air has passed through the oven and become specifically heavier than the ascending currents, by having given out a portion of caloric to the oven, and also by mixing with such vapors as may arise from articles under treatment, it passes out through two flues (X X), (represented by dotted lines in Fig. 8) along diagonal and curved flues (F, F) into the hot air chamber P, there to be reheated, and again to ascend into the oven, and so on to keep up the desired circulation.

The ascending current, (or currents), of heated air as it passes through the chamber (E) to heat the bottom of the oven, is still further heated, and hence still further rarefied by the passage of the smoke &c. in the main flue or tunnel (H) and return flues (K, K), which are arranged directly under the bottom of the chamber (E), and this increased rarefaction of the heated air causes it to ascend into the oven above.

From the arrangement of the furnaces (described above) with their flues and dampers, it will be obvious that when all the dampers, doors, &c. are closed air tight, the products of combustion after reaching the top, and not finding an escape, and becoming specifically heavier, from having given out a portion of caloric, will establish return currents in the same flues through which they ascended, they being of sufficient capacity to admit of it, and return to the furnaces or fire chambers to be reheated, thus keeping up a constant circulation, so that none of the heat evolved will be lost except by radiation through the masonry of the structure, which is to be made of bad conductors of heat to avoid it as much as possible. By the admission of small currents of air through the doors of the furnaces, a slow combustion will be kept up for a long time with a very small expenditure of fuel, and yet evolve sufficient heat to retain any desired and equal temperature in the oven after it has been raised to the point required, for it must be obvious that the quantity of caloric absorbed by the articles under treatment in an oven is very small, and that by this arrangement the only loss of fuel will arise from the escape of heat through the masonry, doors, &c., by radiation, and the escape of heated and incombustible gases evolved from the fuel in the furnaces when it becomes necessary to open the damper in the chimney to excite combustion. By the arrangement of the air heating chamber, without inlets for cold air, and the double set of flues for the circulation of heated air from it to the inside of the oven, and back again to be reheated, the air becomes one of the most rapid, effective and economical vehicles for the transmission of caloric; while at the same time the smoke and other products of combustion, on their passage up and down assist in heating the air on its way from the heating chamber to the oven, and thus tend to increase the circulation.

Another advantage is that the fuel burned, if it be wood, will make charcoal, and coke if mineral coal, nearly as perfect as if made in a retort, on account of the non-employment of grate bars, and the admission of but a very small supply of air which can be arrested at pleasure.

A thermometer should be employed with one end introduced in the oven and the other outside, to ascertain, and enable the attendant to regulate the temperature to the degree required.

It must be obvious that this mode of heating ovens can be greatly varied without any change of the principle; as for instance, the fire chambers, flues, oven &c. may be made of iron instead of masonry, or of iron surrounded by masonry. Or the flues may consist of a series of metal pipes inserted in properly constructed chambers; but all these modifications will be so obvious to the minds of persons skilled in the art of constructing ovens, furnaces, and other apparatus for the management and application of heat, that it does not become necessary further to illustrate the various modes of applying the principle of this invention. It may be well however to state that one, two, or more furnaces or fire chambers can be used to heat one oven, or several ovens within the same structure. And that the flues for the smoke and other products of combustion, where they divide, as described above, can be made single instead of double, although the heat will not be distributed with so much equality. And the same modification is applicable to the flues and other passages for the ascending and descending currents of heated air. The air heating chamber instead of being made back of the furnaces, may surround them in part, in short may be located and formed at the discretion of the constructor, the form and location given in the accompanying drawings, being that which has been essayed and deemed the best, but not by any means to be considered as binding on the constructor so long as he confines himself to the principle.

As a further means of economy, an apparatus may be applied for the purpose of generating gas for lighting purposes. This is represented in front view at Fig. 1, plate 1, and in section at Fig. 4, plate 4. The gas retorts (d, d), constructed in the usual manner, are introduced in the return flues (K, K) which are enlarged at the forward end for this purpose, so that the smoke and other products of combustion circulate around the retorts and thus generate the gas, which when evolved passes up the tubes (d', d'), and thence to the other parts of the apparatus, in the usual manner.

When this oven is applied to the torrefaction (roasting) of coffee, cocoa, &c., the articles to be acted upon are put in appropriate metal cylinders on carriages that run in and out of the oven on wheels, the handle for turning the cylinders passing through apertures in the doors of the oven; but as this makes no part of my invention the representation by drawings is not necessary. It will be obvious that various articles will require various modes of treatment, but that these variations must necessarily be left to the skill and judgment of the constructor.

What we claim as our invention, and desire to secure by Letters Patent, is—

The method described of heating ovens by the circulation of air through them from a heating chamber, combined with the oven by two sets of flues, one for the ascending current, or currents, and the other for the decending current, or currents, by means of which the air after being heated, passes up through the oven, and becoming specifically heavier than the ascending current or currents, by giving out a portion of its caloric, descends to the heating chamber to be again heated, and then again to pass up to, and through the oven, and so on, the hot air or heating chamber not being provided with any aperture for the admission of fresh air to it while in operation. And I also claim in combination with the above method of heating ovens by the circulation of heated air through the oven, the arrangement of furnaces, flues, and dampers, as herein described, operating on the principle of the air tight stove, by means of which combination, the desired temperature can be maintained within the oven at a small expenditure of fuel, while the apparatus possesses the capacity to attain the temperature required, as described. And we also claim arranging the main and return flues for the passage of the smoke and other products of combustion directly under the chamber through which the heated air circulates to heat the bottom of the oven, by means of which the rarefaction of the hot air is increased to cause it to ascend into the oven, as herein described.

P. GRONVELLE.
L. N. MONCHOT.
E. MONCHOT.

Witnesses:
A. Mozet,
Rameay.